Oct. 31, 1961 — W. W. REINEMANN — 3,006,361
VALVE UNIT

Filed Oct. 15, 1957 — 2 Sheets-Sheet 1

INVENTOR
WILFRED W. REINEMANN

BY Quarles, Fox, Seidel, Bateman & Noar

ATTORNEYS

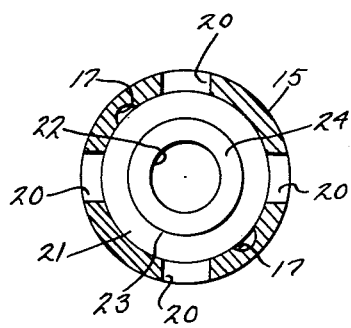
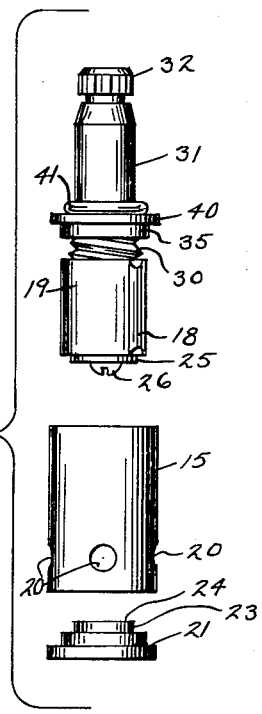
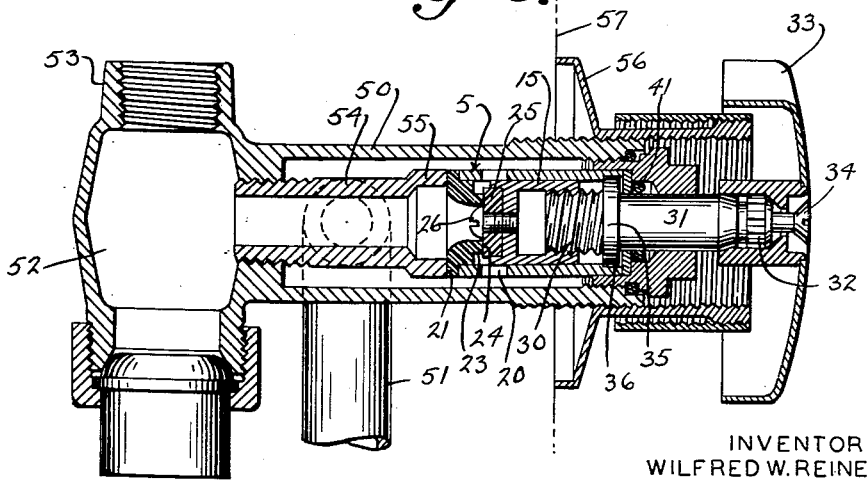

United States Patent Office 3,006,361
Patented Oct. 31, 1961

3,006,361
VALVE UNIT
Wilfred W. Reinemann, Kohler, Wis., assignor to Kohler Co., Kohler Village, Wis., a corporation of Wisconsin
Filed Oct. 15, 1957, Ser. No. 690,280
3 Claims. (Cl. 137—454.5)

The present invention relates to valves, and particularly relates to an improved valve including a replaceable operating valve unit supported within a conventional valve housing.

Among the objects of the present invention is the provision of a replaceable valve unit for a conventional faucet, or other valve device, which unit is adapted to be inserted within or removed from the valve housing chamber, and which unit comprises a valve cage having a cylindrical bore terminating at one end in a removable plug-like, apertured, valve seating member arranged to partially enclose the said bore, a valve plunger slidably received within the said bore and including a replaceable resilient valve washer arranged for seating engagement within the aperture of the removable valve seating member, and which valve plunger further includes a threaded re-entrant bore at its opposite end for receiving the threaded end of a rotatable valve operating stem, and wherein the valve unit includes stop means for preventing axial displacement of the operating stem during rotational movement towards and withdrawal from seating engagement of the valve washer and the valve seating member.

It will be apparent that conventional faucets and like valve fixtures generally are equipped with an integral valve seat in the form of a beveled margin defining the inner end of the fluid entrance opening to the valve housing. This margin is engageable with a replaceable rubber valve washer fastened to one end of a valve plunger, which is usually rotatable responsive to rotative movement of a handle member fastened to the exposed end of a protruding valve stem extending from the opposite end of the plunger.

This construction requires frequent replacement of the valve washer, and very often it is necessary to lap or polish the valve seat to remove burrs caused by grains of sand or other abrasive matter flowing through the entrance and forced between the valve washer and seat during relative closure seating engagement. This wear of both members is particularly enhanced by the rotative or twisting engagement between the members.

Very often the complementary threads of the valve plunger and housing are also worn thin during prolonged and heavy usage of the valve fixture. This condition obviously requires replacement of the entire fixture, even if the wear on the mating washer and integral seat does not, because of the possibility of inserting lapping tools and renewal of the washer. Very often, in the case of household lavatory and bathtub fixtures, the design of the exterior features may have been changed by the manufacturer over the course of years, requiring removal of, and replacement of, not only the entire fixture, but its companion fixture for either hot or cold water as well.

It is, therefore, a principal object of this invention to provide a valve fixture comprising a replaceable valve unit having a removable valve cage supported by a stationary valve housing, wherein the various functional wearing operating members are included as a unit contained within and cooperable with the said cage, and wherein the valve plunger is slidable axially relative to the cage to permit direct seating of the valve washer affixed to one end of the plunger with a renewable valve seating member supported at one end of the valve cage, the seating relationship of the members being accomplished without relative rotative abrasive movement therebetween.

It is another object of the present invention to provide a separable apertured seating member arranged to provide a partial closure of the fluid entrance end of a replaceable valve cage unit, and which seating member may be removed and replaced when necessary without requiring replacement of other operating parts, except for renewal of a conventional valve washer arranged for complementary seating engagement with the seating member, and without disturbance of the main supporting valve body or housing portion.

Other objects and advantages of the invention will be apparent from the following detailed description of preferred forms of embodiment of the invention, reference being made to the accompanying drawings wherein:

FIG. 4 is a full cross sectional view of the valve cage taken along lines 4—4 of FIG. 3.

FIG. 5 is an exploded view indicating the various cooperating parts of the replaceable unit and renewable valve seating member embodying the present invention.

FIG. 6 is a vertical section of a bathtub like faucet embodying the present invention and illustrating another form of supporting the replaceable valve unit.

Figure 1:
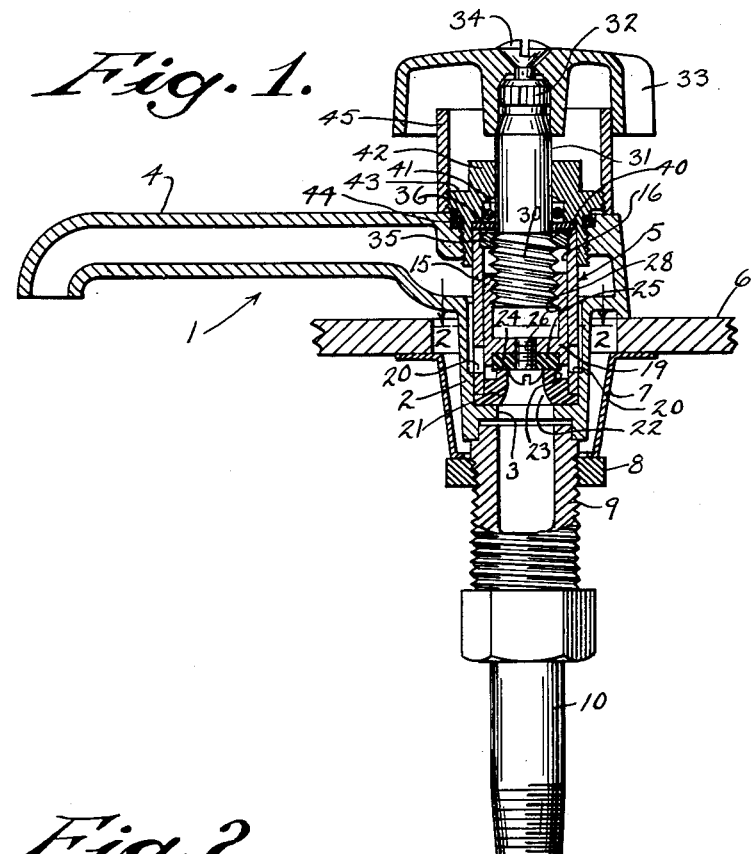
FIG. 1 is a vertical section of a lavatory type faucet embodying the present invention, and with the various operating members being illustrated in valve closed position.
Figure 2:
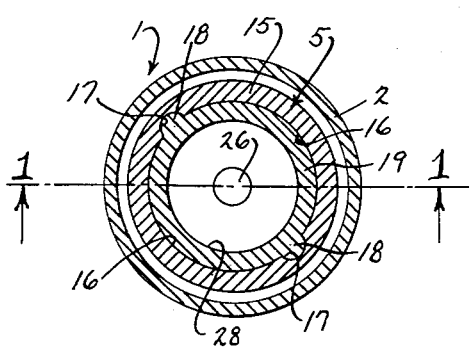
FIG. 2 is a cross sectional view taken on lines 2—2 of FIG. 1.

Referring now to the drawings, and especially to FIGS. 1–5 thereof, the reference numeral 1 designates a conventional household lavatory type faucet in which the present invention may be satisfactorily embodied, although it is within the province of the present invention to adapt the operating members to other types of valves, cocks or faucets having industrial or other usage.

The faucet 1 includes a hollow body portion or valve housing 2 having an inlet 3 opening communicating with a discharge spout 4 through the internal replaceable valve unit generally designated by the reference numeral 5, which will hereinafter be described. The faucet 1 is mounted on a suitable member, as for instance the horizontal surface of a lavatory basin 6, by the usual means which may include a spring type bushing 7 engaging a threaded nut 8, which in turn, is threaded upon the nipple 9 communicating at one end with the inlet 3, and being connectable at its opposite end with a fluid supply conduit 10.

The replaceable valve unit 5 comprises a valve cage 15 including a coextensive cylindrical bore 16. The cage 15 is shown in enlarged detail in the views of FIGS. 2, 3 and 4, and includes at least one longitudinal groove, and preferably diametrically opposed grooves 17, as shown in FIG. 4, engageable with radially extending complementary ribs 18 on an axially slidable valve plunger 19 to prevent rotation of the plunger during operation thereof, as will later be described.

Figure 3:
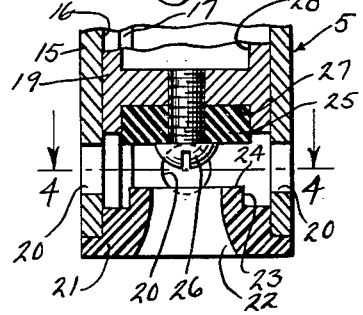
FIG. 3 is an enlarged fragmentary vertical sectional view of a portion of the valve cage and its contents, the valve plunger and the valve washer being shown in valve open position relative to the valve seating member.

As specifically illustrated in FIG. 3, the valve cage 15 includes a plurality of circumferentially spaced lateral exit ports 20 which communicate with the discharge spout 4 through the annular chamber defined by the internal surface of the housing 2 and the external surface of the cage 15. The lower end, as viewed in FIG. 3, of the cylindrical bore 16 of the cage 15 is partially closed by means of valve seating member 21. The seating member 21 includes a central fluid inlet aperture 22, terminating in an integral shoulder portion 23 defining a planar seating surface 24. The surface 24 is adapted to seat a conventional valve washer 25 of rubber or similar resilient material secured to one end of the plunger 19 and secured thereto by means of a machine screw 26 engaging a tapped opening therein. The washer 25 is preferably confined within a recessed area 27 of the plunger 19.

The renewable seating member 21 also preferably provides a seal between the bore surface of the housing 2, the lower inner end of the cage 15 and the inwardly directed shoulder of the housing 2 defining the inlet 3, and thus, may conveniently be of a resilient material that will provide a tight friction fit with the cage 15, such material being preferably of nylon (superpolyamide) cast or machined to desired size and shape. It will be apparent that many other suitable materials may be used including thermosetting materials, such as Teflon (polytetrafluorethylene resin), phenol-formaldehyde, chlorobutadiene, polyethylene resin, acrylic resin (Lucite), polyester resins, epoxy resins, phenol-furan resins and rubber molding compounds. The desirable characteristics in the material include good molding and/or machining qualities, low moisture absorption, high resistance to heat distortion and mechanical strength.

It will also be apparent that the desirable characteristics will also be found in vitrified ceramic seats, various cuprous and ferrous metals (compatible from a "galvanic action-corrosive" standpoint with the material of the cage 15) and a natural wood-like material, such as lignum vitae. Materials, such as those listed in the present group may require additional molding or machining operations, such as threading, for a screw fit with complementary threads (not shown) on the bore of the cage 15.

The essential requirement for a suitable valve seat, in accordance with this invention, is that the member defining the seat be included as an operating portion of a replaceable valve unit.

It is conceivable, though not a preferable embodiment, that the valve seating member may be made as an integral portion of the valve cage (not shown), thus the entire operating valve unit would include all wearing members and be adapted for replacement when the parts have worn and no longer function in a desired manner.

The valve plunger 19 includes a re-entrant bore 28 (FIG. 3) which is threaded inwardly of its open end to receive the complementary threaded portion 30 at the lower end of a rotatable stem 31. The threaded members may be of the left-hand or right-hand variety, in accordance with the usual practice of plumbing equipment manufacturers where paired sets of faucets are provided. The upper portion of the stem 31, as disclosed in FIG. 1, is provided with an annular knurled portion 32 for receiving a manual operating handle 33, which is seated thereon and secured thereto by means of a screw 34 engaging a tapped opening in the upper end of the stem 31.

Intermediate the ends of the stem 31 there is positioned a threaded nut 35, which is preferably threaded as far as it will travel on the threaded portion 30 of the stem 31. The nut 35 extends radially outwardly from the stem to engage with the shoulder 36 of the recessed bore of the upper end of the cage 15 to limit telescopic movement of the stem inwardly of the cage 15 during rotational movement of the stem, as will hereinafter be described. It will be apparent, however, that the nut 35 may be welded at the selected intermediate position on the stem, or may be an integral part of the stem, formed during initial machining operations, if so desired.

A slidable, radially extending washer 40 is preferably disposed upon the upper portion of the stem 31, and preferably is provided with an outer diameter conforming to the outer diameter of the valve cage 15 to provide a closure therefor. A sealing member comprising an O-ring 41 of rubber or similar resilient sealing material is positioned on the stem 31 at the upper side of the washer 40, and provides a seal between the stem 31 and a retaining nut or cap 42. The retaining cap 42 is apertured to freely receive the stem 31 and includes a radially extending, externally threaded flange portion 43, and is also threaded externally at its lower end to engage the internal threads of the valve housing or body portion 2. A gasket 44 is disposed between the retaining nut 42 and the housing 2 as a sealing means. Thus, when the retaining nut 42 is screwed downwardly into the body portion 2, it will maintain all of the operating members in relative position as shown in FIG. 1, wherein the valve is shown in closed position with the valve washer 25 in seating engagement with the valve seating member 21. A decorative spacer bushing 45 is internally threaded to engage the threaded flange portion 43 of the retaining nut 42, and is disposed between the housing 2 and the manual operating handle 33.

The relationship between the various operating components of the replaceable valve unit 5 will be readily apparent from the exploded view of FIG. 5.

In operation, it will be apparent, from the view of FIG. 1, that manual twisting of the operating handle 33 in either direction, depending upon whether the threads are left or right handed, will raise or lower the valve plunger 19 accordingly. That is, the left handed threaded portion 30 of the stem 31, when rotated in a clockwise direction, as viewed from the top of FIG. 1, will cause the stem to travel inwardly of the bore 28 of the plunger 19. Inasmuch as the plunger 19 is freely slidable axially relative to the stationary cage 15, and is prevented from rotating therein by means of the slidable engagement of the complementary ribs 18 and grooves 17, the action will cause the plunger 19 to be withdrawn in an axial direction from the cage 15, and carry with it the valve washer 25. The valve stem 31 is also prevented from telescopic movement inwardly of the cage 15 by means of the engagement of the radially extending nut 35 and the recessed shoulder 36 of the cage 15.

Thus, on clockwise opening motion of the operating handle 33 and stem 31, the washer 25 will be withdrawn from valve closing position relative to the seating member 21 to the position shown in FIG. 3. Fluid under pressure will be permitted to escape from the inlet aperture 22 through the cage exit ports 20, upwardly, through the annular chamber defined by the outer periphery of the cage 15 and the internal surface of the housing 2, to be discharged through the spout 4.

Reverse rotation of the handle 33 will cause the plunger 19 to enter the bore of the cage 15 and seat the washer 25 upon the seating surface 24 of he member 21 to close the entrance or inlet aperture 22 thereof. Outward displacement of the stem 31 will be prevented by engagement of the nut 35 with the washer 40 clamped between the retaining nut 43 and the top edge of the cage 15.

A further embodiment of the present invention will be described in connection with the illustration of FIG. 6, wherein the replaceable operating valve unit is disposed within the chamber of the housing of a conventional bathtub type faucet or fixture, generally designated by the reference numeral 50. In both embodiments illustrated, like parts will be designated by like reference numerals.

The main feature of the embodiment of FIG. 6 lies in the adaptation of the replaceable valve unit 5 for application in a conventional bathtub type valve fixture.

Fixtures of this type conventionally require an outlet connection in the wall of a tubular housing member 50 for connection with a fluid conduit 51. The conduit 51 leads to a conventional discharge mixing spout (not shown) for blending to the desired temperature hot and cold water leading from respective fixtures. The fluid, in this case, water, enters the housing from a conventional T-shaped chamber 52 integral with the housing 50. The T-shaped configuration permits a connection to be made at the upper threaded portion 53, as shown in FIG. 6, for connection to a shower conduit (not shown), if desired. A threaded hollow, cylindrical, fluid entrance member 54 is threadingly inserted for communication with the T portion 52 and includes a bell-shaped end portion 55 having a flat surface for flush end-to-end engagement with the exposed surface of the seating member 21 of the valve unit 5. All of the operating parts of the valve unit 5 in both illustrated embodiments are substantially identical, except for proportionate variations in size, if such is desired.

The particular arrangement shown permits secure sealing relationship between the fluid entrance member 54 and the valve unit 5, taking into account variations in supporting wall thickness 57 intermediate the exposed end of the valve housing and the plumbing position thereof. Thus, the member 54 may be cut off to desired length and adjusted by means of its threaded portion without interfering with proper valve action between the member and the valve unit 5. A decorative cap 56 is provided in addition to the bushing 45 for flush attachment with the stationary wall surface 57 to which the fixture is attached.

It will be apparent that the present invention provides an improved valve unit for conventional valve fixtures, wherein the valve unit is adapted to be replaceable and includes all of the operating members, subjected to wear, therein, and further, wherein the valve plunger member bearing the valve washer may be restrained from rotative movement during axially slidable movement thereof into and out of valve seating position. Another improved feature of the present invention includes the provision of a renewable valve seating member in combination with the replaceable valve unit and which is independent of the valve housing, and which may be conveniently removed and replaced after it no longer functions in a useful fashion to seal the valve unit from fluid entrance therethrough.

I claim:

1. In a valve unit the combination comprising a valve cage in the form of an open ended sleeve; an inlet valve seat open through the center having a rim that seats against the edge at one end of the valve cage sleeve to form an extension of the sleeve that presents an endwise facing bearing surface defining the terminus of the valve unit, which valve seat further defines a portion extending around the edge of the valve cage sleeve into the interior of and in frictional engagement with the valve cage and forms a seat facing inwardly of the valve cage; a valve plunger of uniform cross-section to provide a substantially coextensive bearing surface adjacent the inner sleeve surface of said valve cage and axially slidable totally within the valve cage, said valve plunger having a valve at one end in facing relation to said seat of the inlet valve seat and having an axially extending thread at its opposite end; means preventing rotation of the valve plunger with respect to the valve cage; and a rotatable operating stem threadedly engaged at one end with said axial thread of said valve plunger and extending from the valve cage to terminate in an operating end.

2. In a valve unit the combination comprising a housing having a chamber with side walls, an entrance at one end, a fluid inlet at the opposite end which presents an abutment surface facing said entrance, and an outlet; a removable valve cage in the form of an open ended sleeve that will slide axially through said chamber entrance and which is disposed with said chamber in alignment with said fluid inlet; a replaceable inlet valve seat open through the center having a rim that seats against the edge at the end of the valve cage sleeve nearest said fluid inlet and that presents a bearing surface resting against said abutment surface of said fluid inlet, which valve seat turns around the edge of the valve cage sleeve into the interior of and in frictional engagement with the valve cage and forms a seat facing inwardly of the valve cage; a valve plunger of uniform cross-section to provide a substantially coextensive bearing surface adjacent the inner sleeve surface of said valve cage and axially slidable totally within the valve cage having a recessed seat at one end thereof defined by a peripheral marginal portion arranged to receive and circumferentially reinforce a replaceable valve washer seated therein in facing relation to said seat of the inlet valve seat, and said valve plunger having an axially extending threaded re-entrant bore at its oppoiste end; means preventing rotation of the valve plunger with respect to the valve cage; a rotatable operating stem threadedly engaged at one end with said axial thread of said valve plunger and extending from the valve cage and through the housing entrance to terminate in an operating end, said stem having a circumferential ledge that seats against the valve cage to restrict axial movement; and retaining cap means that closes said housing entrance and encircles said operating stem which threadedly engages the housing and bears against the end of the valve cage opposite the inlet valve seat to calmpingly retain the valve cage and valve seat between the housing fluid inlet and the cap means, and which retaining cap means also restricts axial movement of the operating stem from the housing when assembled.

3. In a valve unit the combination comprising a housing having a chamber, an entrance at one end, a fluid inlet at the opposite end which presents an abutment surface, and a fluid outlet; a removable valve cage in the form of an open ended sleeve axially slidable within said chamber including a replaceable valve seat member at one end and providing a recessed shoulder at its opposite end; a valve seat member having a bore and including a seat portion extending inwardly of and in frictional engagement with said sleeve and an outwardly extending portion having a surface resting aagainst said fluid inlet; a valve plunger of uniform cross-section to provide a substantially co-extensive bearing surface adjacent the inner sleeve surface of said valve cage and axially slidable totally within the valve cage and including a valve member at one end of said plunger housed in the cage that is movable toward and away from said valve seat member, said plunger and valve member being held from rotation with respect to said valve cage; a rotatable operating stem threadedly engaged with said valve plunger and extending therefrom through said housing entrance which is restrained from axial movement; a radially extending stop member secured to said stem intermediate the ends thereof and arranged for rotatable seating engagement with the recessed shoulder of said valve cage to limit endwise movement of said stem inwardly of said valve cage; an enclosing washer with a center opening revolubly disposed on said stem and extending radially beyond said stop member and engageable with the marginal edge extending outwardly endwise of the recessed shoulder of said valve cage; a sealing O-ring revolubly disposed on said stem adjacent said washer; and retaining cap means closing said housing entrance which concurrently engages said housing and clampingly retains said valve cage against rotation between said means and said housing fluid inlet, said retaining cap means being in abutting engagement with a marginal portion of said enclosing washer radially of said O-ring.

References Cited in the file of this patent

UNITED STATES PATENTS 330,524     Stover _____ Nov. 17, 1885

(Other references on following page)

UNITED STATES PATENTS

| | | |
|---|---|---|
| 606,867 | Hoover | July 5, 1898 |
| 976,908 | Payne | Nov. 29, 1910 |
| 1,419,650 | Sorenson | June 13, 1922 |
| 1,602,118 | Mortimer | Oct. 5, 1926 |
| 1,662,659 | Brinstock | Mar. 13, 1928 |
| 1,947,257 | Fritz et al. | Feb. 13, 1934 |
| 2,062,422 | Meese | Dec. 1, 1936 |
| 2,089,848 | Hoferle | Aug. 10, 1937 |
| 2,277,251 | Palmer | Mar. 24, 1942 |
| 2,341,411 | Ojalvo | Feb. 8, 1944 |
| 2,632,662 | Carnahan | Mar. 24, 1953 |
| 2,661,019 | Snyder | Dec. 1, 1953 |
| 2,701,119 | Smith | Feb. 1, 1955 |
| 2,796,079 | Hugg | June 18, 1957 |
| 2,797,701 | Nurkiewicz | July 2, 1957 |